United States Patent [19]

Callaway

[11] Patent Number: 4,770,377

[45] Date of Patent: * Sep. 13, 1988

[54] CORD HOLDING DEVICE

[76] Inventor: James J. Callaway, Rt. 11, Moran Rd., Franklin, Tenn. 37064

[*] Notice: The portion of the term of this patent subsequent to Nov. 10, 2004 has been disclaimed.

[21] Appl. No.: 105,129

[22] Filed: Oct. 6, 1987

Related U.S. Application Data

[63] Continuation-in-part of Ser. No. 894,835, Aug. 8, 1986, Pat. No. 4,702,443.

[51] Int. Cl.$^4$ ............................................. F16L 3/00
[52] U.S. Cl. ........................................ 248/51; 5/496; 5/508; 24/72.5; 24/132 AA; 24/456; 24/462; 248/74.4; 248/205.1
[58] Field of Search ................. 248/74.4, 74.3, 51, 248/205.1, 231.6, 359 F; 24/72.5, 460, 462, 456, 132 AA; 5/496, 508, 503, 504, 424, 494, 498

[56] References Cited

U.S. PATENT DOCUMENTS

| | | |
|---|---|---|
| 806,251 | 12/1905 | Childs . |
| 2,435,082 | 1/1948 | Huber ............................. 24/72.5 X |
| 2,557,877 | 6/1951 | Kluson ........................... 24/132 AA |
| 2,876,464 | 3/1959 | Helverson ............................ 5/317 |
| 3,179,991 | 4/1965 | Seal ..................................... 24/73 |
| 3,426,412 | 2/1969 | Streng et al. ..................... 24/462 X |
| 3,491,412 | 1/1970 | Johnson ........................... 248/205.1 |
| 3,848,840 | 11/1974 | Umezu ........................... 248/74.3 X |
| 4,417,710 | 11/1983 | Adair .................................. 248/51 |
| 4,431,154 | 2/1984 | Hamm . |
| 4,484,367 | 11/1984 | Jenkins . |
| 4,562,624 | 1/1986 | Kanzaka . |

FOREIGN PATENT DOCUMENTS 2735509 2/1979 Fed. Rep. of Germany .

Primary Examiner—David L. Talbott
Attorney, Agent, or Firm—Holman & Stern

[57] ABSTRACT

A cord holding device for retaining an electrical cord in strategic position on a hospital bed in a convenient location relative to a patient lying on the bed has a base member which in use may be secured by adhesive or a belt to a mattress cover or a mattress pad underneath a bed sheet. A holder member snaps onto the base member over the bed sheet so as to trap the bed sheet therebetween. The holder member carries a pushbutton assembly by which it may be released from the base member by depression of the pushbutton. A U-shaped saddle in inverted form fits into the top of the pushbutton to releasably secure the electrical cord between the saddle member and the pushbutton.

6 Claims, 1 Drawing Sheet

CORD HOLDING DEVICE

CROSS-REFERENCE TO RELATED APPLICATIONS

This application is a continuation-in-part of application Ser. No. 06/894,835 filed Aug. 08, 1986, now U.S. Pat. No. 4,702,443 and the contents of which is expressly incorporated herein by reference.

BACKGROUND OF THE INVENTION

This invention relates to a cord holding device which is particularly although not exclusively suitable for securing an electrical or like cord on a patient's hospital bed or the like in an accessible position convenient to the patient.

Hospital rooms are usually provided with various patient-operable electrical devices, such as nurse call buttons, radios, and the like, and it is obviously desirable for their operating switches, generally on cords, to be readily accessible to a patient lying in bed. Often, such electrical cords, terminating in operating switches, are simply tied around the bedhead, but this is not particularly convenient, and there have been proposals in the past for the provision of clamp-type devices and the like which secure such cords in a desired position to the actual bed clothes. Examples of such devices may be seen, in prior U.S. Pat. Nos. 2,876,464 and 3,179,991.

Various objects of the invention include, for example, the provision of a novel form of cord holding device for the general purpose indicated in securing electrical cords to hospital or other beds; the provision of a cord holding device which can be securely retained in a required position on the bed clothes while being relatively simple to release and reposition; a cord holding device which can locate and secure cords of different size; and a cord holding device from which the cord can be released, if required, without removing the entire device from the bed, so that the cord can be resecured to the bed in the original position.

The invention as disclosed in the parent application provides a three-part cord holding device comprising a base member, which in use may be secured by adhesive or by a belt to a mattress cover, pad or the like under a bed sheet, a cord holder member which snaps onto the base member over the bed sheet, so as to trap the bed sheet therebetween, the cord holder member having a cylindrical wall with spaced top-opening slots for receipt of the cord with the cord extending chord-wise across the holder member, and a cover member which snaps onto the holder member to trap the cord in the slots. The cover member may have a depending cylindrical wall with bottom-openings slots complementary to the slots in the cord holder member so as to trap the cord therebetween, so that the cover member can be rotated on the holder member thereby adjusting the effective width of the slots to suit different size cords. Friction means, such as peripheral teeth on one member and an interfitting projection on the other member, may be provided for retaining the cover member in a selected rotational position.

The holder member in the parent application is provided with a pushbutton for engaging against the base member and forcing these members apart when the pushbutton is depressed, thereby separating the holder member from the bed clothes, the pushbutton having an actuating portion extending upwardly through a central opening in the cover member. All of the components of the tender may be molded in a hard plastic.

SUMMARY OF THE INVENTION

The present invention provides a cord holding device which is of a generally similar nature to the cord holding device disclosed in the parent application, but which includes certain modifications which may be said to improve or simplify its structure.

Thus, a cord holding device in accordance with the present invention comprises a base member of a generally similar nature to the base member of the parent application and which in use may be secured by adhesive or by a belt to a mattress cover, pad or the like under a bed sheet, a holder member which snaps onto the base member over the bed sheet to trap the bed sheet therebetween, and a pushbutton which fits through the holder member for engaging against the base member and forcing the base member and holder member apart when the pushbutton is depressed, thereby separating the holder member from the bedclothes, the pushbutton having an actuating portion extending outwardly from the holder member.

In the modified form of the device according to the present invention, however, instead of the holder member being used to receive the cord and a separate cover being provided to secure the cord, as in the parent, in this case a saddle member is provided for releasably engaging the top of the pushbutton to secure the cord between the saddle member and the pushbutton. At least to an extent, this simplifies the holding and the detaching arrangement afforded the cord.

As in the parent application, all of the components of the device may be molded in a hard plastic.

Additional features and advantages of the invention will become apparent from the following description and claims read in conjunction with the attached drawings.

DESCRIPTION OF THE PREFERRED EMBODIMENT

Figure 1:
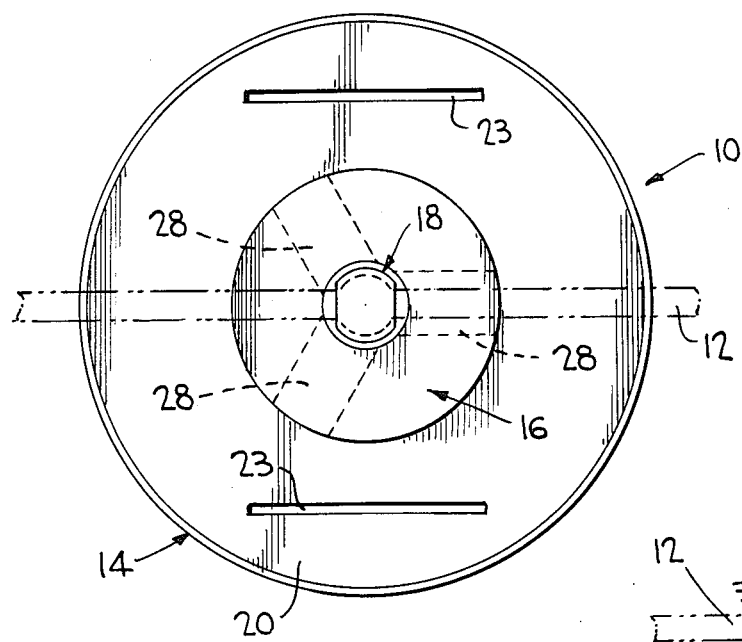
FIG. 1 is a plan view of a cord holding device in accordance with the invention.
Figure 2:
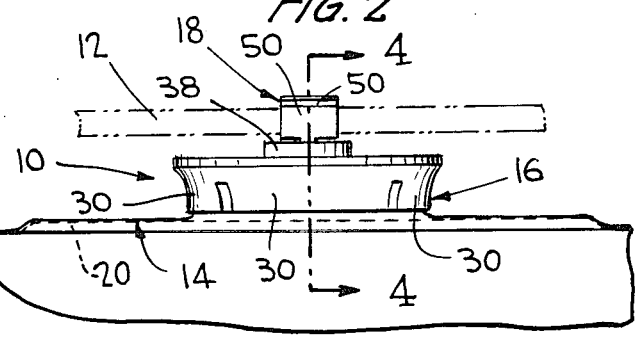
FIG. 2 is an elevational in use view of the cord holding device.
Figure 3:
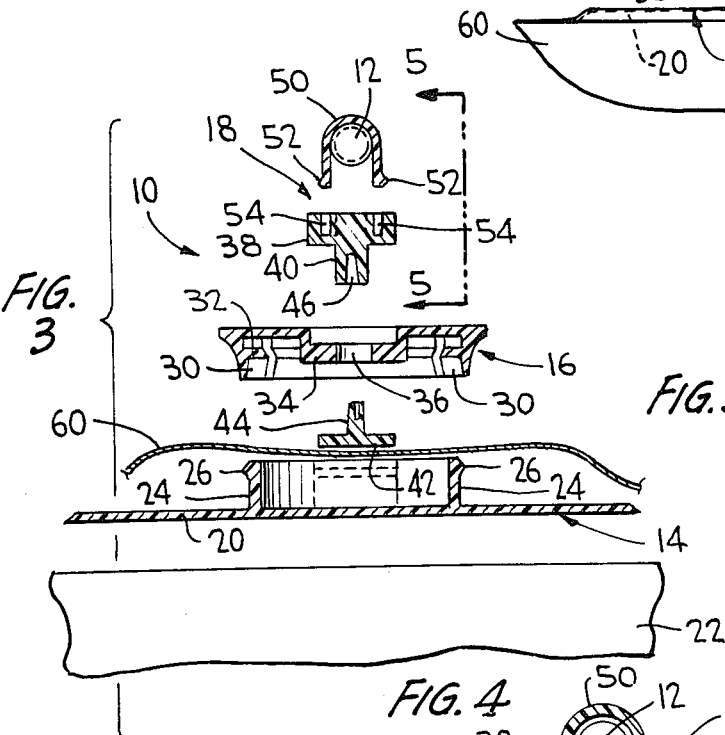
FIG. 3 is an exploded sectional view of the device.
Figure 5:
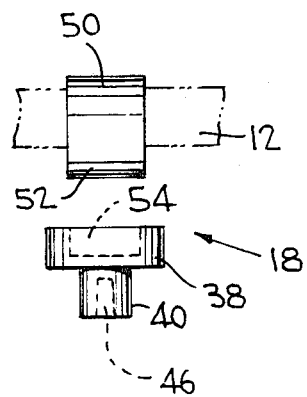
FIG. 5 is an enlarged exploded elevational view on line 5—5 of FIG. 3 showing parts of a pushbutton assembly.

It is understood that the cord holding device 10 in accordance with the invention is used in similar manner to the device disclosed in the parent application for locating and securing an electrical cord 12 in strategic position on a hospital bed or the like (not shown) so that a cord switch operating for example nurse call equipment may be situated in a convenient position readily accessible to a patient lying on the bed.

Generally, the cord holding device 10 comprises a base member 14, a holder member 16, and a pushbutton assembly 18.

The base member 14 has a circular flange 20 for sitting on a mattress or mattress cover 22 of the patient's bed. The flange may be provided with slots 23 to receive a belt or the like for securing the device on the bed or alternatively, the undersurface of the flange may have an adhesive. Projecting upwardly from flange 20 are arcuate wall elements 24 with outwardly projecting teeth 26. The center portion of flange 20 between the elements 24 may be solid or may be molded as three equally spaced radial limbs 28, see FIG. 1, which meet in the center of the flange.

The holder member 16 is generally of an inverted cup-like form with a depending peripheral skirt portion defining spaced prongs 30, or the like with internal teeth 32 which snap resiliently over the teeth 26 on the base member to releasably secure the two parts together. Further, the holder member is formed with a central boss portion 34 and axial through bore 36 for receiving the pushbutton assembly 18.

Figure 4:
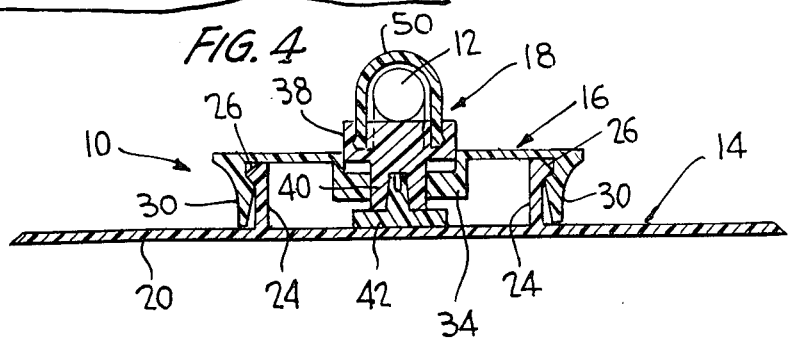
FIG. 4 is a sectional elevational view of the device as assembled.

The pushbutton assembly 18 has a central pushbutton hub member 38 with a depending stem 40 and a flanged bottom member 42 with a pin 44 which is a pressfit in a blind bore 46 formed at the bottom of stem 40. The hub member and bottom member of the pushbutton assembly are press-fitted together with stem 40 extending through the central bore 36 of holder member 16 as seen most clearly in FIG. 4. The pushbutton is thus trapped for up and down movement within the holder member 16 and the configuration is such that bottom portion 42 of the pushbutton can be pressed down against the central hub between limbs 28 of the base member when the holder member and base member are mutually assembled.

The pushbutton assembly 18 further includes a cord-holding saddle member 50 which is of generally inverted-U shaped form with dimples 52 at the bottom of each leg for resiliently retaining the saddle member in slots 54 formed in the top of the pushbutton hub 38. Cord 12 can thus be releasably trapped between saddle 50 and pushbutton hub 38 and can be released by pressing the limbs of the saddle resiliently toward one another in order to remove the saddle from slots 54.

It will be evident from the foregoing that with the base member 14 placed on a mattress 22 or the like, the holder 16 can then be snapped onto the base member with a bed sheet 60 trapped therebetween. The cord 12 can then be secured and released, as required using the saddle 50 as previously described. In order to remove holder member 16 from base member 14, downward pressure may be applied on the pushbutton assembly causing its bottom member 42 to apply pressure against the central portion of flange 20 and separating the holder member from the base member in similar manner to that described in the parent application.

While only a preferred embodiment of the invention has been described herein in detail, the invention is not limited thereby and modifications can be made within the scope of the attached claims.

What is claimed is:

1. In a cord holding device for retaining an electrical cord on a bed cover, such as a bed sheet laid over an underlying bedding element, such as a mattress cover, the combination comprising a base member having a base flange, attachment means for securing the flange substantially face-to-face on the bedding element under the said covering, first clamp means extending upwardly from the base flange, a holder member including second clamp means for snapping onto the first clamp means over the bed covering and trapping the bed covering therebetween, and a pushbutton means carried by the holder member for engaging the base flange of the base member and disengaging the holder member from the base member by depression of the pushbutton means, the pushbutton means having an upper portion projecting upwardly from the holder member.

2. The combination as defined in claim 1 which further includes a saddle member releasably attachable to the upper portion of the pushbutton means for securing a cord therebetween.

3. The combination as defined in claim 2 wherein the saddle member is in the form of an inverted-U having limbs with free ends adapted to fit in corresponding slots formed in the upper portion of the pushbutton means.

4. The combination as defined in claim 1 wherein the pushbutton means comprises a hub member defining said upper portion, a depending stem on the hub member, a bottom member, and attachment means between the stem and the bottom member, further wherein the holder member includes a central boss with a bore formed therethrough, the bottom member of the pushbutton means being attached to the stem with the stem received for up and down movement in said bore, and the bottom member being trapped beneath said boss.

5. The combination as defined in claim 4 including a saddle member releasably attachable to the hub member for securing a cord therebetween.

6. The combination as defined in claim 4 wherein the first clamp means comprises first cylindrical wall defining means extending outwardly from the base flange, and the second clamp means comprises second cylindrical wall defining means on the holder member adapted to snap over the first wall defining means.

* * * * *